April 24, 1956 W. M. ROBB 2,742,985
TRANSMISSION MECHANISM FOR POWER DRIVEN MONORAIL VEHICLES
Filed April 28, 1953 2 Sheets-Sheet 1

INVENTOR
WILLIAM MUIR ROBB
BY
Marshall, Marshall & Yeasting
ATTORNEYS

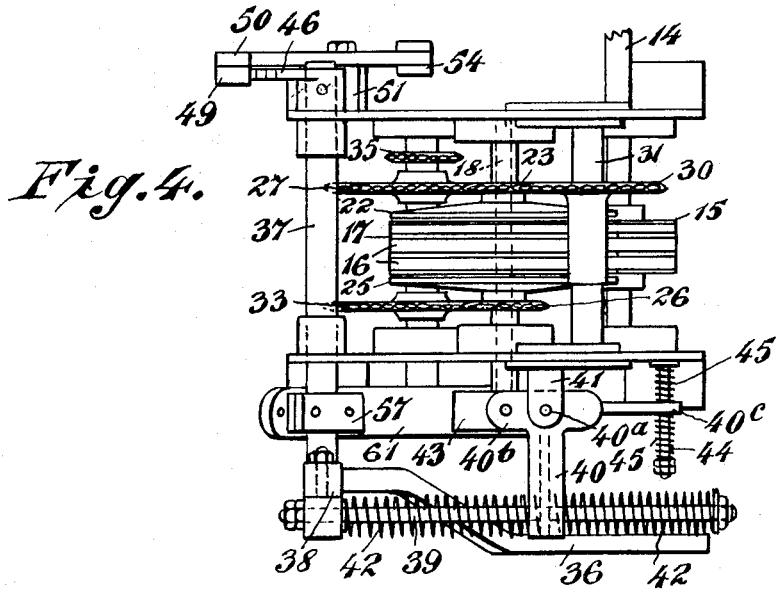
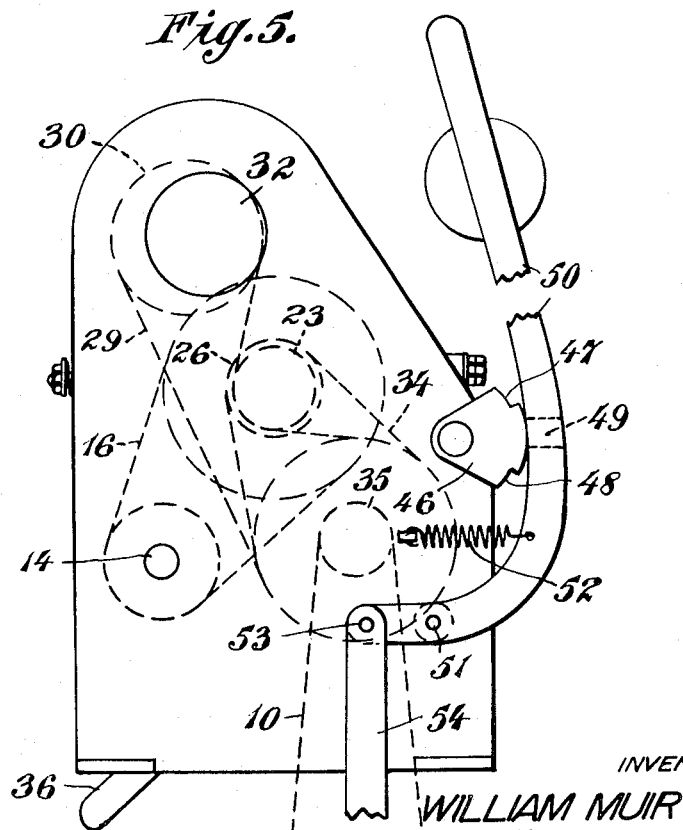

United States Patent Office 2,742,985
Patented Apr. 24, 1956

2,742,985
TRANSMISSION MECHANISM FOR POWER DRIVEN MONORAIL VEHICLES

William Muir Robb, West Grayton, England, assignor of one-half to Road Machines (Drayton) Limited, West Drayton, England, a British company Application April 28, 1953, Serial No. 351,566

2 Claims. (Cl. 192—4)

This invention relates to improvements connected with power driven vehicles for traverse upon a monorail system and relates particularly to the gear box therefor.

The object of the present invention is to provide a gear box for a power driven vehicle for traverse upon a monorail system providing a simple form of forward and reverse drive and brake mechanism on the driven shaft which is automatically applied when the gear box is in the neutral position and to provide means whereby upon the vehicle reaching a predetermined point upon the monorail system the drive is automatically disengaged and the brake applied.

The invention consists in the provision in a power driven vehicle for traverse upon a monorail system of a gear box comprising in combination a driven clutch drum, a forward drive clutch disc on one side of said drum and a reverse drive clutch disc on the other side of said drum, manually operable means for moving the drum axially into driving engagement with either of said clutch discs, the drum being biased towards its neutral position, spring loaded catch mechanism for retaining said drum in driving engagement with either of said discs and means operable by a stop selectively associated with the rail for releasing said catch mechanism.

A convenient embodiment of the present invention will now be described with particular reference to the accompanying drawings, in which:

Fig. 4 is a plan of the gear box seen in Fig. 2 with the driving chains omitted for the sake of clarity and Fig. 5 is a side elevation of the gear box seen in Fig. 2 as seen from the opposite side.

Figure 1:
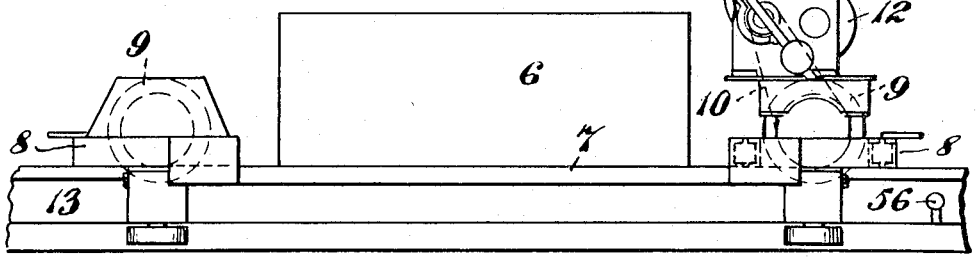
Fig. 1 is a side elevation of a typical form of power driven vehicle mounted upon a monorail system and incorporating a gear box in accordance with the present invention.
Figure 2:
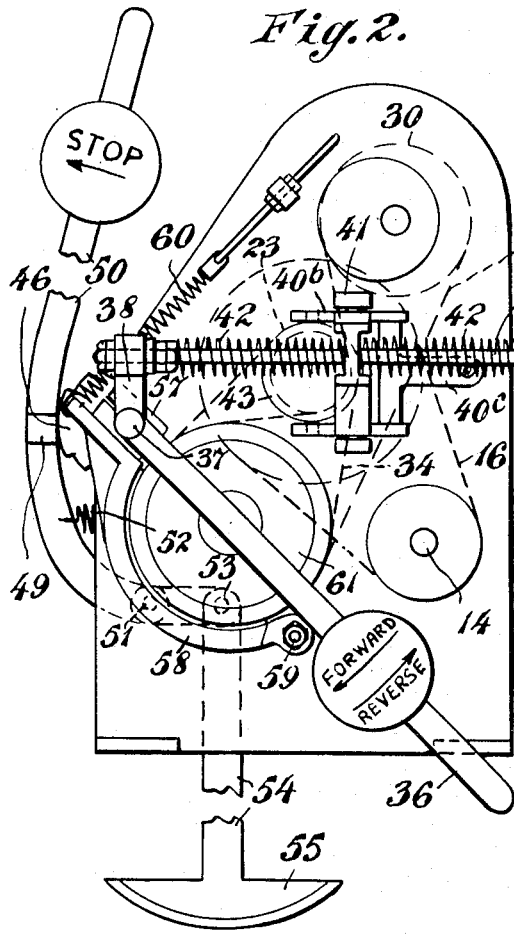
Fig. 2 is an enlarged side elevation of the gear box seen in Fig. 1 shown removed from the vehicle.
Figure 3:
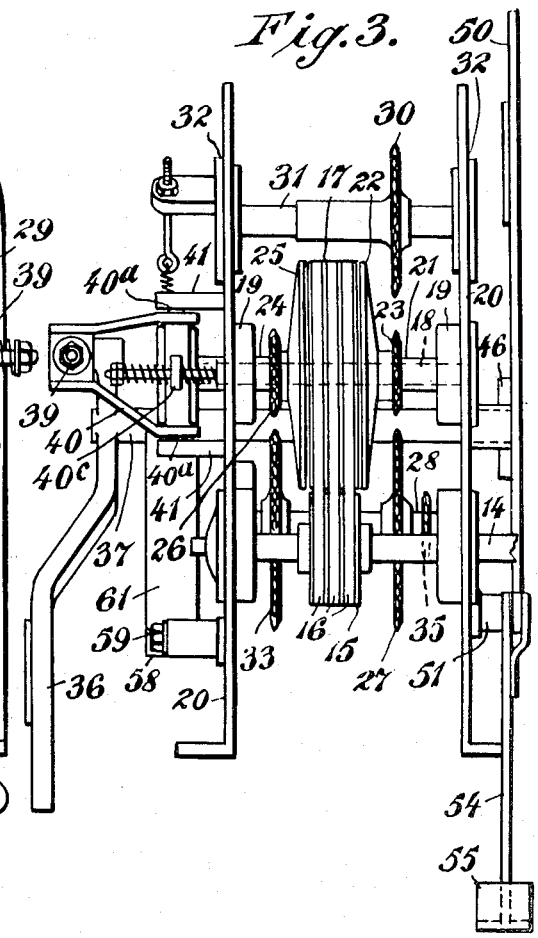
Fig. 3 is an end view of the gear box as seen from the right hand side of Fig. 2 with the driving chains omitted for the sake of clarity.

Referring first to Fig. 1 of the accompanying drawings there is shown a power driven vehicle which is of the kind described in the specification of my co-pending application for Letters Patent Serial No. 351,564 filed April 28, 1953 which incorporates a vehicle body 6 mounted on a main frame 7 to the ends of which are connected sub-frames 8 containing bogie wheels 9 the one of which is adapted to be driven through a chain 10 from the driven shaft of a gear box generally designated 11, the positively driven shaft whereof is coupled to a small internal combustion engine 12. This vehicle is shown mounted upon a portion of a length of rail 13 of a monorail system in accordance with the specification of my co-pending application for Letters Patent Serial No. 351,564 filed April 28, 1953.

Referring now more particularly to Figs. 2–5 of the accompanying drawings wherein the gear box which constitutes the novel part of the present invention is shown on a larger scale, 14 represents the driving shaft of the gear box which is coupled to the motor 12 or other power source mounted upon the vehicle. Mounted on the shaft 14 is a multiple belt pulley 15 which through multiple belts 16 is in driving engagement with a clutch drum 17. The clutch drum 17 is fixedly mounted upon the shaft 18 which is permitted a limited axial sliding movement within its bearings 19 in the frame of the gear box 20 under the control of mechanism which will be referred to hereinafter. Mounted upon a sleeve 21 which is rotatably mounted about the shaft 18 on the one side of the clutch drum 17 (i. e. the right hand side as viewed in Fig. 3) is a clutch disc 22 for reverse drive which has a friction face for engagement with the clutch drum 17 and this sleeve 21 also carries a sprocket wheel 23. Rotatably mounted about the shaft 18 on the other side of the clutch drum 17 is another sleeve 24 carrying a clutch disc 25 for forward drive which has a friction face for engagement with the clutch drum 17, this sleeve 24 also carrying a sprocket wheel 26. A small clearance normally obtains between the clutch drum 17 and each of the clutch discs 22 and 25 so that a neutral position obtains wherein neither of these clutch discs is driven by the drum 17. However if the shaft 18 is moved to the right as viewed in Fig. 3 the clutch drum 17 will be moved into frictional engagement with the clutch disc 22 for reverse drive since the sleeve 21 cannot move to the right, whilst if the shaft 18 is moved to the left as viewed in Fig. 3 the clutch drum 17 is moved into frictional engagement with the clutch disc 25 for forward drive since the sleeve 24 cannot move to the left. The sprocket wheel 23 is in driving engagement with the sprocket wheel 27 on the driven shaft 28 through a chain 29 which passes round an idle sprocket 30 on the shaft 31. The sprocket wheel 23 bears upon the chain 29 intermediate the sprocket wheels 27 and 30 and on the outside of the chain (as shown in Fig. 5) and in order to maintain this engagement, means is provided for tensioning the chain 29 which consists in the bushes 32 which are rotatable in the frame 20 of the gear box and have eccentrically mounted therein the bearings of the shaft 31, it being understood that rotation of the bushes 32 will effect a movement of the shaft 31 towards or away from the driven shaft 28. The sprocket wheel 26 is in driving engagement with the sprocket wheel 33 on the driven shaft 28 through the chain 34.

From the foregoing description it will be appreciated that if the clutch drum 17 is in engagement with the disc 22 the driven shaft 28 is rotated in a reverse direction whilst if the clutch drum 17 is in engagement with the clutch disc 25 the driven shaft 28 is rotated in a forward direction. The driven shaft 28 has mounted thereon a sprocket wheel 35 which through the chain 10 (Figs. 1 and 5) is in driving engagement with the one bogie wheel 9 of the vehicle.

At the one side of the gear box is manually operable lever 36 which is mounted at the one extremity of a transverse spindle 37 passing through the frame of the gear box. This spindle carries the radial arm 38 which carries the rod 39 which passes through a hole in the one limb of a double rocker lever 40 which carries trunnions 40a mounted in fixed brackets 41 on the frame of the gear box. Mounted about the rod 39 on opposite sides of the rocker 40 are opposed coiled compression springs 42 which translate any axial movement of the rod 39 into a rocking movement of the rocker 40 about the axis of its trunnions 40a. The limbs 40b of the rocker have a pin engagement with a bearing block 43 in which the one end of the shaft 18 is rotatable but non-axially movable, so that any rocking of the rocker 40 will be translated into an axial movement of the shaft 18. A further limb or extension 40c of the rocker 40 has an aperture therein in which is engaged a rod 44 fixed to the frame of the gear box and surrounding this rod 44 are opposed coiled compression springs 45 which bear upon the limb or extension 40c so as to spring load the rocker 40 to a position in which the clutch drum 17 is in a mid-way position and the gear box is in neutral. The power of these springs 45 is such that the lever 36 would return to the neutral position immediately it was released were there not provided means for retaining the gear box in forward or reverse drive.

The means for retaining the gear box in forward or reverse drive compises a segmental catch plate 46 mounted on the shaft 37 on the opposite side of the gear box to the lever 36. This segmental plate has a pair of opposed steps 47 and 48 formed in its periphery either one of which can be engaged by a protuberance 49 on a catch lever 50 which is pivotally mounted on the frame of the gear box 51 and is spring loaded towards the plate 46 by the coiled tension spring 52. When the lever 36 is depressed to engage forward gear the segmental plate 46 will be rocked upwardly as viewed in Fig. 5 and the protuberance 49 will engage the step 48 and retain the forward drive engaged, whilst if the lever 36 is raised to engage reverse drive the protuberance 49 will engage the step 47 to maintain the drive, it being understood that movement of the lever 50 to the right, as viewed in Fig. 5, will disengage the protuberance 49 from either of the said steps and allow the gear box to return to neutral under the action of the springs 45.

Pivotally connected at 53 to the lower end of the lever 50 is a vertically slidable rod 54 which carries at its lower end an arcuate shoe 55 (see Fig. 2) which is positioned adjacent the rail 13 upon which the vehicle is traversed. This shoe is adapted to be contacted by a stop, one of which is shown at 56 in Fig. 1, which can be connected to the rail in a selected position. When the vehicle is being traversed upon the monorail system in either forward or reverse gear and the shoe 55 strikes a stop 56, the arm 54 is raised thereby effecting a rocking of the lever 50 about its pivot 51 to automatically disengage the protuberance 49 from the step 47 or 48 with which it is associated and thereby effect a disengagement of the drive and the return of the gear box to neutral under the action of the springs 45.

Mounted on the shaft 37 is a cam 57 which bears against the free end of a brake shoe 58 which is pivoted on the frame of the gear box at 59 and is spring loaded by a spring 60 into engagement with a brake drum 61 mounted at the one end of the driven shaft 28. The shape of the cam 57 is such that when the lever 36 is in the neutral position of the gear box the brake shoe 58 is permitted to engage the brake drum 61 under the action of its spring loading 60 but as soon as the lever 36 is moved to engage either forward or reverse drive the brake shoe 58 is rocked about its pivot 59 to disengage it from the brake drum 61.

From the foregoing it will be understood that when it is desired to traverse the vehicle upon the monorail system the required gear is manually engaged by means of the lever 36 and the gear is maintained in this position until the vehicle has been traversed to a point wherein the shoe 55 strikes a stop 56 whereupon the drive is automatically disengaged and the brake applied. Should it be desired to stop the vehicle before it reaches a stop 56 associated with the rail, then it is only necessary to move the lever 50 to the left as viewed in Fig. 2.

I claim:
1. In a gear box for a power driven vehicle having a traction wheel, the combination of a driven clutch drum having a clutch surface at each end thereof, a forward drive disk located adjacent one end of said drum, a reverse drive disk located adjacent the other end of said drum, said drive disks being mounted coaxially with said drum and having clutch surfaces facing the clutch surfaces at the ends of said drum, yieldable means tending to move said drum into neutral position and to yieldably hold the clutch faces at its ends out of engagement with the clutch faces of said drive disks, manually operable means for selectively moving said drum axially to bring the clutch face at either of its ends into driving engagement with the clutch face of the drive disk located adjacent such end, spring loaded catch mechanism for retaining said drum in position to maintain such driving engagement of clutch faces, and means operable by engaging an obstruction in the path of such vehicle for releasing said catch mechanism to permit said yieldable means to move said drum into neutral position.

2. In a gear box for a power driven vehicle having a traction wheel, the combination of a multiplebelt driven clutch drum having a clutch surface at each end thereof, a forward drive disk located adjacent one end of said drum, a reverse drive disk located adjacent the other end of said drum, said drive disks being mounted coaxially with said drum and having clutch surfaces facing the clutch surfaces at the ends of said drum, yieldable means tending to move said drum into neutral position and to yieldably hold the clutch faces at its ends out of engagement with the clutch faces of said drive disks, manually operable means for selectively moving said drum axially to bring the clutch face at either of its ends into driving engagement with the clutch face of the drive disk located adjacent such end, spring loaded catch mechanism for retaining said drum in position to maintain such driving engagement of clutch faces, and means operable by engaging an obstruction in the path of such vehicle for releasing said catch mechanism to permit said yieldable means to move said drum into neutral position, transmission mechanism operatively connecting each of said drive disks to a traction wheel of such vehicle, a brake for retarding the movement of said transmission mechanism and means actuated upon release of said catch mechanism for applying said brake to said transmission mechanism.

References Cited in the file of this patent

UNITED STATES PATENTS

| | | |
|---|---|---|
| 424,693 | Turner et al. | Apr. 1, 1890 |
| 1,091,853 | Lewis | Mar. 31, 1914 |
| 1,157,582 | Rigby | Oct. 19, 1915 |
| 1,292,170 | Wagner | Jan. 21, 1919 |
| 1,543,889 | Wickes | June 30, 1925 |
| 2,073,774 | Atteslander | Mar. 16, 1937 |
| 2,159,250 | Brantly | May 23, 1939 |
| 2,608,699 | Csencsics | Sept. 2, 1952 |